July 13, 1954  A. M. GOODLOE  2,683,500
FILTER UNIT AND METHOD OF PRODUCING SAME
Filed April 17, 1951  4 Sheets-Sheet 1
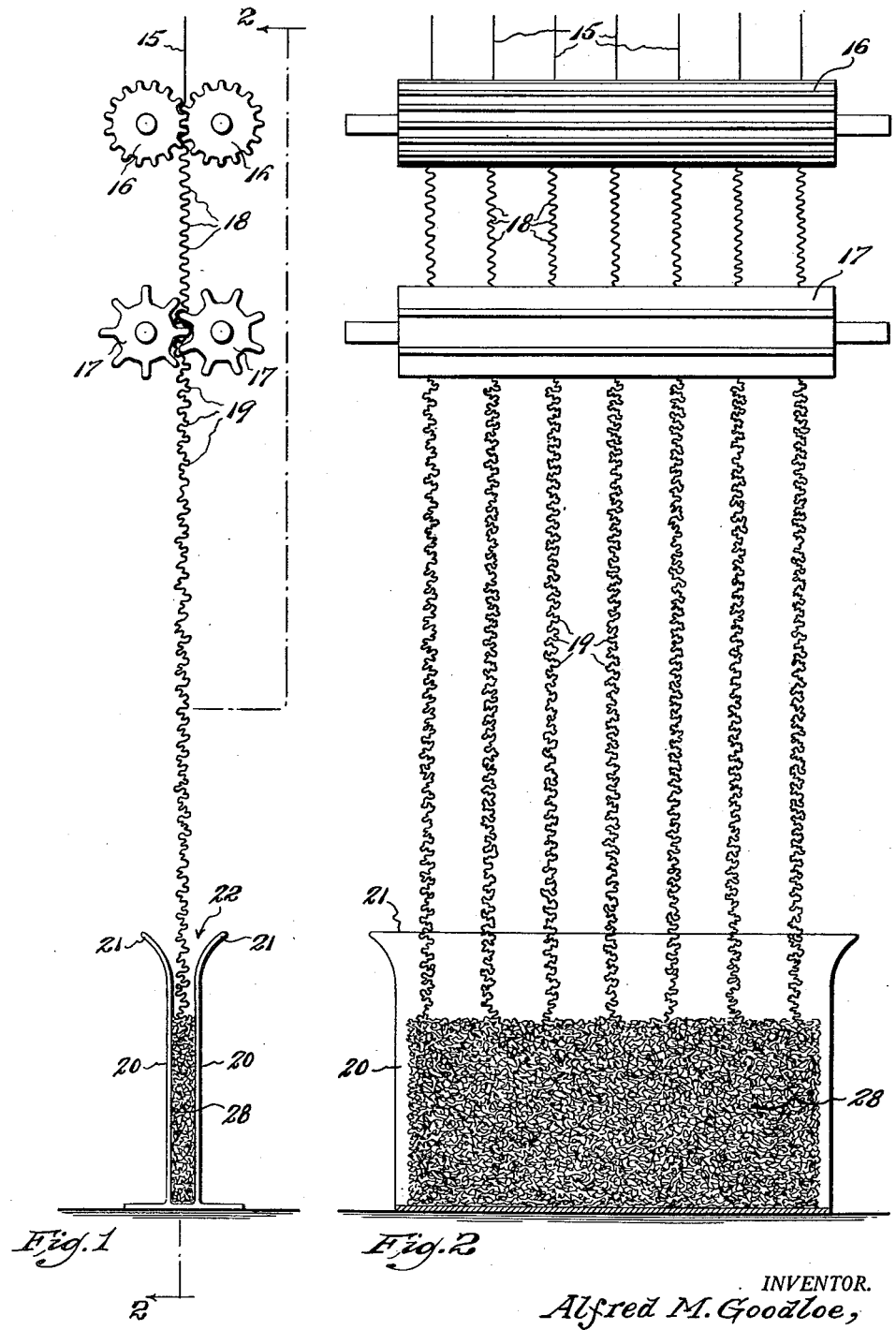
INVENTOR.
Alfred M. Goodloe,
BY George D. Richards
Attorney July 13, 1954 A. M. GOODLOE 2,683,500
FILTER UNIT AND METHOD OF PRODUCING SAME
Filed April 17, 1951 4 Sheets-Sheet 2

INVENTOR.
Alfred M. Goodloe,
BY George D. Richards
Attorney

July 13, 1954  A. M. GOODLOE  2,683,500
FILTER UNIT AND METHOD OF PRODUCING SAME
Filed April 17, 1951  4 Sheets-Sheet 3

INVENTOR.
Alfred M. Goodloe,
BY George S. Richards
Attorney

July 13, 1954     A. M. GOODLOE     2,683,500
FILTER UNIT AND METHOD OF PRODUCING SAME
Filed April 17, 1951     4 Sheets-Sheet 4

INVENTOR.
Alfred M. Goodloe,
BY George D. Richards,
Attorney,

Patented July 13, 1954

2,683,500

UNITED STATES PATENT OFFICE 2,683,500

FILTER UNIT AND METHOD OF PRODUCING SAME

Alfred Minor Goodloe, Upper Montclair, N. J., assignor to Metal Textile Corporation, Roselle, N. J., a corporation of Delaware Application April 17, 1951, Serial No. 221,403

4 Claims. (Cl. 183—45)

This invention relates to an improved filter unit for use in filtering devices of various kinds, such as air cleaners of the oil bath type, liquid filters and the like; and the invention further relates to a novel method of producing said filter unit.

The invention has for an object to provide a filter body in the form of a foraminous or interstitial mass of interentangled double crimped wire filaments or strands so relatively distributed, felted together and compacted as to produce a porous body of substantially uniform density throughout its mass, and one which is free from striation; the filter body so characterized being retained against deformation and disintegration by an enveloping jacket of tubular knit mesh, preferably knit wire mesh.

The invention has for a further object to provide a novel method of producing the aforesaid filter unit which comprises the steps of double crimping the wire filaments or strands to assure intimate and substantially uniform entanglement and felting thereof when conglomerated; then assembling the double crimped filaments or strands into a bat; then forming the bat to desired filter body shape; and finally applying to the formed filter body an enveloping jacket of tubular knit mesh; the steps of the method being so carried out that filter units of predetermined size and uniform characteristics can be rapidly produced economically with a minimum expenditure of labor.

The above and other objects of this invention will become apparent as the following description is read in connection with the accompanying drawings, in which:

Fig. 1 is a schematic view illustrating the step of double crimping wire filaments or strands and accumulating and conglomerating the same to form a bat therefrom; and Fig. 2 is a longitudinal sectional view, with parts in elevation, taken on line 2—2 in Fig. 1.

Figure 4:
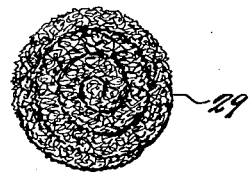
Fig. 4 is an end elevational view of a filter body formed by rolling the bat of Fig. 3 upon itself.
Figure 5:
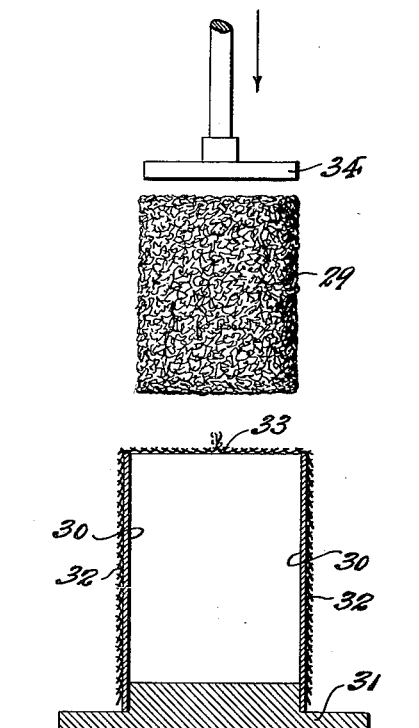
Figure 6:
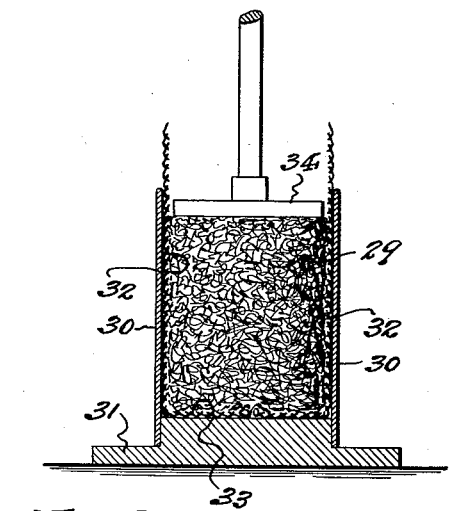

Fig. 5 is a vertical sectional view, in part elevation, showing the means for applying an enveloping jacket of tubular knit mesh to the filter body of Fig. 4, and as disposed preparatory to assembling said jacket and filter body; and Fig. 6 is a view similar to that of Fig. 5 but showing the manipulation of the filter body and jacket forming tubular knit mesh, whereby to apply the latter to the former.

Figure 7:
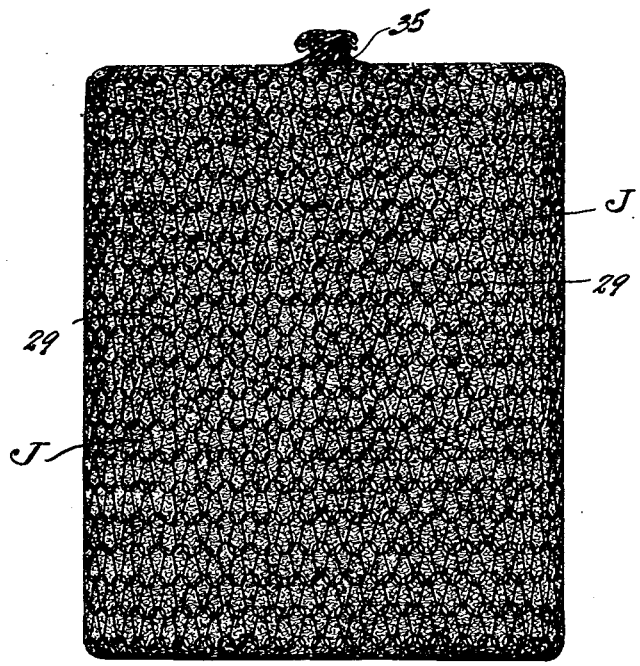

Fig. 7 is a side elevational view of the completed filter unit comprising the filter body and its enveloping knit mesh jacket, this view being drawn on an enlarged scale.

Figure 8:
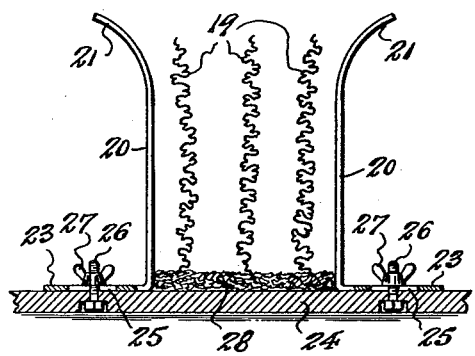
Figure 9:
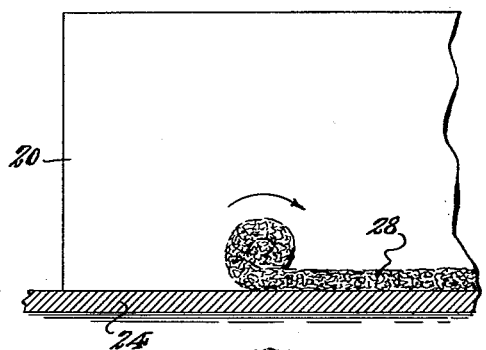

Fig. 8 is a schematic view illustrating modified means for accumulating and conglomerating double crimped wire filaments or strands, whereby to form a bat therefrom; and Fig. 9 is a longitudinal sectional view of said modified means, the same showing initiation of the operation of rolling the bat into a cylindrical filter unit.

Figure 10:
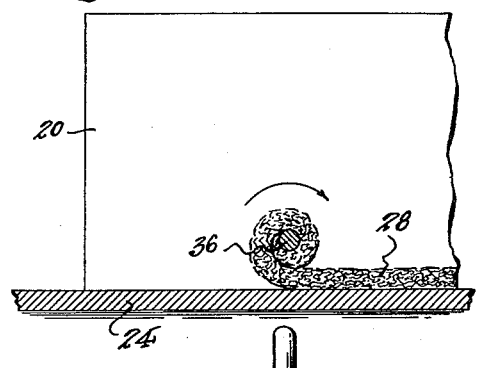
Figure 11:
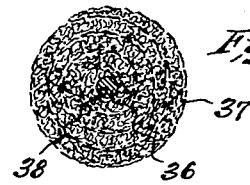

Fig. 10 is a view similar to that of Fig. 9 but showing initiation of the operation of so rolling the bat into a cylindrical filter body as to provide the latter with an axial opening extending therethrough; and Fig. 11 is an end elevational view of the resultant filter body.

Figure 13:
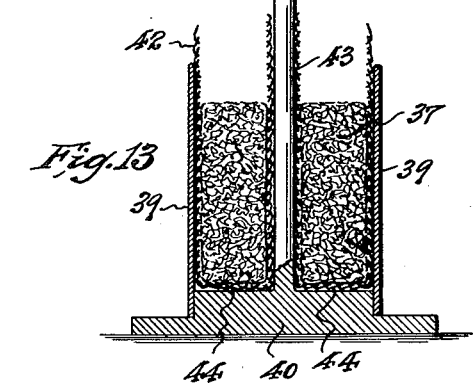
Figure 12:
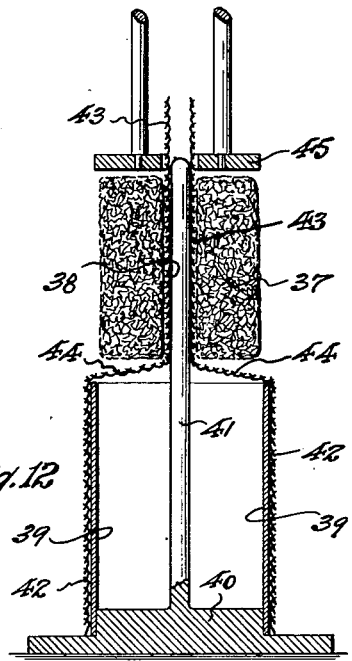

Fig. 12 is a view similar to that of Fig. 5 but showing modified means whereby to apply an enveloping jacket of tubular knit mesh to a filter body formed with an axial opening extending therethrough; and Fig. 13 is a similar view showing the manipulation of said filter body and jacket forming knit mesh, whereby to apply the latter to the former.

Similar characters of reference are employed in the hereinabove described views, to indicate corresponding parts.

To produce a filter unit according to this invention, a suitable number of relatively laterally spaced wire filaments or strands 15 are first subjected to successive crimping operations, whereby said wire filaments or strands may be said to be "double crimped." To accomplish this, the wire filaments or strands 15 are passed between a first pair of intermeshing crimping rolls 16, the teeth of which are of relatively short or small pitch, and next between a second pair of intermeshing crimping rolls 17, the teeth of which are of comparatively long or large pitch. In passing through the first set of crimping rolls 16, the short or small pitch teeth thereof produce successive comparatively small symmetrical crimps 18 in the wire filaments or strands. The thus initially crimped wire filaments or strands, being led to and passed between the crimping rolls 17, are engaged by the long or large pitch teeth of the latter, and are thus subjected to a second crimping action which produces successive comparatively large crimps 19 therein. These large crimps 19 are superposed upon and thus include the small crimps 18, thereby forming composite or double crimps which are asymmetrical, and which project at various radial angles relative to and about the axis of each filament or strand.

The double crimped wire filaments or strands are discharged from the crimping rolls downwardly into an upwardly open bat forming trough. This bat forming trough is formed by a pair of upstanding side walls 20 having outwardly flared top marginal portions 21 which provide the trough with a wide receiving mouth 22 adapted to guide the filaments or strands into the trough interior. The trough is of a length suitable to form therein a bat of desired length. The side walls 20 of the trough may be spaced apart to correspond to the thickness of the bat to be produced, so that the formed bat stands edgewise within the trough, as shown in Fig. 1. Preferably, however, the trough is so arranged as to form the bat flatwise therein, with the walls of the trough mounted subject to adjustment toward and from one another, whereby to permit desired variation in the width of bat produced, and thus in the length or height of filter body to be formed from the bat in the manner hereinafter more particularly described. To this end, as shown in Fig. 8, the side walls 20 of the trough are provided with foot flanges 23 footed upon a supporting base 24. Said foot flanges 23 are provided with transverse slots 25 through which threaded studs 26, which are fixed in the base 24, project for the reception of thumb-nuts 27, or like manipulatable fastening devices, by means of which the trough side walls 20 can be fixed to the base 24 in desired adjusted spaced apart relation, according to the width of bat desired to be obtained.

As the double crimped wire filaments or strands enter the bat forming trough, the same will weave back and forth therein between the side walls 20 thereof, and will accumulate and build up within the trough interior, until a sufficient mass thereof has accumulated to form a bat of desired width or thickness, as the case may be. As the double crimped wire filaments or strands thus accumulate within the trough, the asymmetrical composite crimps of contiguous portions of the accumulated filaments or strands will interengage and intermesh, whereby to be intimately and substantially uniformly interentangled and felted together into a bat 28.

Figure 3:
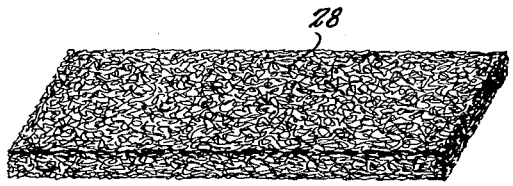
Fig. 3 is a perspective view of a bat produced from conglomerated double crimped wire filaments or strands.

After a sufficient quantity of the doubled crimped wire filaments or strands have been accumulated and felted together to form a bat 28 of desired dimensions, feeding of the filaments or strands to the trough is interrupted, and the filaments or strands are severed to separate the bat therefrom, whereupon, if the bat is formed edgewise, as in Fig. 1, the bat is removed from the trough, and thereupon rolled endwise upon itself to form a cylindrical filter body 29. If the bat 28 is formed flatwise in the trough, as in Fig. 3, the bat can be rolled upon itself within and through the trough, thus producing the cylindrical filter body 29 during the operation of removing the bat from the trough (see Fig. 9).

The rolling of the bat 28 upon itself tends to uniformly compact the interentangled double crimped wire filaments or strands of which it is composed, and thus to more closely and intimately felt the composite crimps together. As a consequence of this the filter body 29 formed from the rolled bat 28 acquires substantially uniform density and substantially uniform interstitial structure or texture throughout its mass; its interstitial structure being free from striation, so that undesirable channeling of fluid flow therethrough is avoided when the filter body is in use.

To retain the filter body 29 against deformation and disintegration, the same is enclosed in an enveloping jacket made of tubular knit mesh, and preferably a tubular knit mesh knitted from a metallic material or wire strand.

Application of the knit mesh jacket to the filter body 29 is accomplished by the following novel means and procedure. An upstanding, upwardly open cylindrical mold 30 is mounted on a suitable base 31. A sleeve 32 of tubular knit mesh is telescoped over the external sides of the mold 30, and its upper end portion then gathered together and suitably secured so as to form a closed end portion 33 extending over the upwardly open end of the mold 30.

The sleeve of the tubular knit mesh having been operatively assembled with the mold 30 as described, the filter body 29 is axially aligned with the mold, intermediate the latter and a reciprocable plunger 34 (see Fig. 5), whereupon said plunger is moved downward to thrust the filter body 29 against the closed end portion 33 of the tubular knit sleeve 32, and thereupon downwardly into the interior of the mold 30. As the filter body 29 is thus moved into the mold 30, it carries downwardly therewith into said mold the closed end portion 33 of the tubular knit sleeve, and, in so doing, draws the tubular body 32 of said mesh sleeve over the margins of the open end of the mold and into the interior of the latter, so as to dispose said tubular mesh body 32 around the sides of the filter body 29 in enveloping relation thereto (see Fig. 6). After this the plunger 34 is retracted, and the partially enveloped filter body is then withdrawn from the mold, whereupon the free end portion of the tubular knit sleeve 32 is gathered together and secured so as to form an upper closed end portion 35 extending across the top end of the filter body in covering relation thereto, thus completing an enveloping jacket J of knit mesh within which the filter body is enclosed, and by which it is securely held against deformation and disintegration, and thereby producing a filter unit structure according to this invention.

It is sometimes desirable to so form the filter body as to provide the same with an axially extending trough opening of selected diameter, and to further provide such form of filter body with an enveloping jacket of knit mesh material covering both its external and internal surfaces. To accomplish this, after a bat 28 of felted double crimped wire filaments or strands is produced, said bat is rolled upon itself over a forming roll 36 of a diametric size corresponding to the diameter of axial opening which the filter body is to possess (see Fig. 10). Upon completion of the bat rolling operation, the forming roll 36 is removed, thereby providing a filter body 37 having an axial opening 38 extending therethrough (see Fig. 11).

Application of a knit mesh jacket to the filter body 37 is accomplished by the following modified means and procedure (see Figs. 12 and 13). An upstanding, upwardly open mold 39 is mounted on a suitable base 40, and extending from said base 40, axially upward through the interior of the mold, and so as to project outwardly through and exteriorly of the open upper end of the latter for a distance preferably in excess of the length of the filter body 37 to be operated upon, is a core member 41 of diametric size approximating the diameter of the axial opening 38 of said filter body. A tubular knit mesh sleeve 42 of suitable length is telescoped over the external sides of the mold 39. The freely projecting upper end portion of this tubular knit mesh sleeve 42 is stretched, whereby to reduce its diameter conformably to the diameter of the mold core member 41, thus forming an axial sheath section 43 to extend over the latter. Such shaping of the tubular knit mesh sleeve produces an end closure portion 44 which extends over the open top of the mold around said core member 41.

The tubular knit mesh sleeve 42—43—44 having been operatively assembled with the mold 39 and its core member 41 as described, the axially open filter body 37 is telescoped over the exterior free end portion of the core member 41 and the knit mesh sheath section 43 which covers the latter, thus disposing said sheath section in contiguous covering relation to the internal surface of the axial opening 38 of the filter body. A centrally perforate reciprocable plunger 45 is opposed to the thus positioned filter body 37, and is thereupon moved downward to thrust the latter against the end closure portion 44 of the knit mesh sleeve 42, and then downwardly into the interior of the mold 39. As the filter body 37 is thus moved into the mold 39, it draws the tubular knit mesh sleeve 42 over the margin of the open end of said mold and into the interior thereof, thereby disposing the knit mesh around the external side surfaces of the filter body 37 in enveloping relation to said filter body (see Fig. 13). After this the plunger 45 is retracted, and the partially enveloped filter body 37 is withdrawn from the mold, whereupon the free end portions of the knit mesh sleeve 42 and its sheath section 43 are gathered together and secured in covering relation to the top end of the filter body, thereby completing an enveloping jacket of knit mesh which covers both the external and internal surfaces of the filter body, thus producing a filter unit structure having the desired axial opening extending therethrough.

Although I have described by way of illustration filter units according to this invention which are of cylindrical shape, it will be obvious that the units may be produced in other shapes if so desired.

It will be understood that some changes could be made and that apparently widely different embodiments of this invention could be made without departing from the scope thereof as defined by the here following claims. It is therefore intended that all matter contained in the foregoing description and shown in the accompanying drawings shall be interpreted as illustrative and not in a limiting sense.

I claim:

1. The method of producing a filter unit of the kind described comprising forming a plurality of relatively laterally spaced double crimped wire filaments, each provided with a run of crimps of small pitch and a second run of crimps of large pitch superposed upon the crimps of small pitch; continuously delivering said double crimped wire filaments into a receiving trough wherein the same are mutually interentangled and felted together into a flat bat of predetermined width and length and of substantial thickness; rolling said bat upon itself into a unitary cylindrical filter body, with contiguous surfaces of the convolutions thereof intermeshed to form a non-stratified body mass; telescoping a sleeve of tubular knit wire mesh over an upwardly open cylindrical mold with an end portion of said sleeve closed across the upper open end of said mold; disposing the rolled filter body in axially aligned opposition to the open end of the mold; then moving said filter body into the mold whereby to carry the mesh sleeve therewith into said mold so as to envelop the side surfaces and an end of the filter body; and finally closing and securing the remaining open end of said mesh sleeve over the opposite end of said filter body to thus form said sleeve into a continuous enveloping jacket operation to confine the filter body mass against deformation and disintegration and thereby completing the filter unit.

2. The method of producing a filter unit of the kind described comprising forming a plurality of relatively laterally spaced double crimped wire filaments, each provided with a run of crimps of small pitch and a second run of crimps of large pitch superposed upon the crimps of small pitch; continuously delivering said double crimped wire filaments into a receiving trough wherein the same are mutually interentangled and felted together into a flat bat of predetermined width and length and of substantial thickness; rolling said bat upon itself over a mandrel into a cylindrical filter body having an axial opening extending therethrough, with contiguous surfaces of the convolutions thereof intermeshed to form a non-stratified body mass; telescoping a sleeve of tubular knit wire mesh over an upwardly open mold having an axial core member therein to extend outwardly from the open upper end thereof and then stretching the upper free end portion of said mesh sleeve to diametrically reduce the same for disposition contiguous to and around said core member with an intermediate portion laterally extending over the upper open end of the mold; engaging the axially open filter body over the core member and said diametrically reduced portion of the mesh sleeve contiguous thereto, with said filter body axially opposed to the open end of the mold; then moving the filter body into the mold so as to envelop the external and internal sides and bottom end of said filter body; then removing the thus enveloped filter body from the mold and its core member; and finally closing and securing together the free end portions of the mesh sleeve over the top end of the removed filter body to thus provide a continuous enveloping jacket to confine the filter body mass against deformation and disintegration.

3. An all metallic filter body for use in air cleaners of the oil bath type and the like comprising a bat of predetermined width and length and of substantial thickness formed solely from a plurality of asymmetrically interentangled and felted together double crimped wire filaments, each wire filament including a run of crimps of small pitch and a second run of crimps of relatively large pitch superposed upon said run of crimps of small pitch, said bat being rolled upon itself with contiguous surfaces of the convolutions thereof intermeshed to form a unitary cylindrical body free from stratification within its mass, and a jacket of tubular knit metallic wire mesh continuously and conformably enveloping the side and end surfaces of said filter body to confine the same against deformation and disintegration.

4. An all metallic filter body for use in air cleaners of the oil bath type and the like comprising a bat of predetermined width and length and of substantial thickness formed solely from a plurality of asymmetrically interentangled and felted together double crimped wire filaments, each wire filament including a run of crimps of small pitch and a second run of crimps of relatively large pitch superimposed upon said run of crimps of small pitch, said bat being rolled upon itself into a cylindrical filter body having an axial opening extending therethrough and with contiguous surfaces of the convolutions thereof intermeshed to form a non-stratified body mass, and a jacket of tubular knit metallic wire mesh continuously and conformably enveloping the external and internal side surfaces and the end surfaces of the filter body to confine the same against deformation and disintegration.

References Cited in the file of this patent

UNITED STATES PATENTS

| Number | Name | Date |
|---|---|---|
| 1,752,670 | Kingman | Apr. 1, 1930 |
| 1,774,232 | Hartwell | Aug. 26, 1930 |
| 1,886,671 | Gottschalk et al. | Nov. 8, 1932 |
| 1,923,900 | Wilson | Aug. 22, 1933 |
| 1,951,956 | Wood | Mar. 20, 1934 |
| 2,274,684 | Goodloe | Mar. 3, 1942 |
| 2,281,017 | Barnhardt | Apr. 28, 1942 |
| 2,331,693 | Jacobs et al. | Oct. 12, 1943 |
| 2,334,263 | Hartwell | Nov. 16, 1943 |